(12) United States Patent
Chin

(10) Patent No.: US 10,606,136 B2
(45) Date of Patent: Mar. 31, 2020

(54) VARIABLE FOCAL LENGTH LIQUID CRYSTAL LENS ASSEMBLY COMPRISING A PLURALITY OF FIRST AND SECOND CONDUCTIVE LINES THAT CROSS EACH AND STRUCTURE THEREOF

(71) Applicant: SILICON TOUCH TECHNOLOGY INC., Hsinchu (TW)

(72) Inventor: Chi-Yuan Chin, Hsinchu (TW)

(73) Assignee: SILICON TOUCH TECHNOLOGY INC., Hsinchu (TW)

( * ) Notice: Subject to any disclaimer, the term of this patent is extended or adjusted under 35 U.S.C. 154(b) by 58 days.

(21) Appl. No.: 15/695,742

(22) Filed: Sep. 5, 2017

(65) Prior Publication Data

US 2018/0180968 A1 Jun. 28, 2018

(30) Foreign Application Priority Data

Dec. 27, 2016 (TW) .............................. 105143347 A

(51) Int. Cl.
*G02F 1/1347* (2006.01)
*G02F 1/29* (2006.01)
(Continued)

(52) U.S. Cl.
CPC ............. *G02F 1/1347* (2013.01); *G02B 3/14* (2013.01); *G02F 1/134309* (2013.01);
(Continued)

(58) Field of Classification Search
CPC .. G02B 27/64; G02B 3/0081; G02F 2201/122
See application file for complete search history.

(56) References Cited

U.S. PATENT DOCUMENTS 8,994,915 B2   3/2015 Zohrabyan et al.
2001/0055145 A1  12/2001 Hamada
(Continued)

FOREIGN PATENT DOCUMENTS

CN   103454825 B   7/2015
CN   105103045 A   11/2015
(Continued)

*Primary Examiner* — Paul C Lee
(74) *Attorney, Agent, or Firm* — Li & Cai Intellectual Property (USA) Office

(57) ABSTRACT

The instant disclosure provides a variable focal length liquid crystal lens assembly and structure thereof. The liquid crystal lens structure includes a first electrode set, a second electrode set and a liquid crystal layer disposed between the first and second electrode sets. The second electrode set includes first and second electrode structures, the first electrode structure including a first transparent insulating layer and a first electrode layer disposed on the first transparent insulating layer, the second electrode structure including a second transparent insulating layer and a second electrode layer disposed on the second transparent insulating layer. The first electrode layer includes a plurality of first conductive lines and the second electrode layer includes a plurality of second conductive lines. The first and the second conductive lines are separated from each other and are arranged alternately for providing a matrix electric field to the liquid crystal layer.

8 Claims, 6 Drawing Sheets

(51) Int. Cl.
*G02F 1/1343* (2006.01)
*G02B 3/14* (2006.01)
(52) U.S. Cl.
CPC .......... *G02F 1/29* (2013.01); *G02F 2001/294* (2013.01); *G02F 2201/122* (2013.01)

(56) References Cited

U.S. PATENT DOCUMENTS

| | | | |
|---|---|---|---|
| 2012/0236043 A1* | 9/2012 | Jung | G02B 27/2214 345/690 |
| 2012/0262663 A1* | 10/2012 | Chin | G02B 3/14 349/200 |
| 2012/0305899 A1* | 12/2012 | Taki | C08G 61/126 257/40 |
| 2012/0314144 A1 | 12/2012 | Sugita et al. | |
| 2012/0320288 A1 | 12/2012 | Baek et al. | |
| 2014/0198289 A1 | 7/2014 | Shimizu et al. | |
| 2015/0219911 A1* | 8/2015 | Cho | G02F 1/1393 349/15 |

FOREIGN PATENT DOCUMENTS

| | | |
|---|---|---|
| CN | 205787509 U | 12/2016 |
| JP | 1981067821 A | 6/1981 |
| JP | 2014-006440 A | 1/2014 |
| JP | 2015072474 A | 4/2015 |
| JP | 2016-062100 A | 4/2016 |
| JP | 2016157449 A | 9/2016 |
| KR | 10-1521660 B1 | 5/2015 |
| KR | 10-1677997 B1 | 11/2016 |
| TW | I370265 | 8/2012 |

* cited by examiner

VARIABLE FOCAL LENGTH LIQUID CRYSTAL LENS ASSEMBLY COMPRISING A PLURALITY OF FIRST AND SECOND CONDUCTIVE LINES THAT CROSS EACH AND STRUCTURE THEREOF

BACKGROUND

1. Technical Field

The instant disclosure relates to a variable focal length liquid crystal lens assembly and a structure thereof, and in particular, to a variable focal length liquid crystal lens assembly and a structure thereof having the property of spherical or aspherical lenses.

2. Description of Related Art

A liquid crystal lens structure is a lens with variable focal length and includes a liquid crystal layer and a pair of electrode sets disposed on the two opposite sides of the liquid crystal layer. In addition, the liquid crystal lens structure can further include alignment layers disposed between the liquid crystal layer and the two electrode sets. The two electrode sets receive a driving voltage provided by an external circuit, and hence, the liquid crystal molecules in the liquid crystal layer deflect and orient to form a texture which provides effects similar to an optical lens. Therefore, light is focused or diverged after passing through the liquid crystal lens structure in accordance with the arrangement of the liquid crystal molecules.

In addition, a liquid crystal lens including a plurality of liquid crystal lens structures can achieve the function of zoom-in and zoom-out by adjusting the pattern of the deflection of the liquid crystal molecules in each set of the liquid crystal lens structures.

However, the existing liquid crystal lens structures can only provide the function of spherical lenses.

SUMMARY

In order to solve the drawback in the prior art, the instant disclosure provides a variable focal length liquid crystal lens assembly and a structure thereof which include a second electrode set with at least two electrode structures. Based on a matrix electric field generated by the two electrode structures, the liquid crystal lens structure provided by the instant disclosure can have the function of spherical lens and aspherical lens.

An embodiment of the instant disclosure provides a liquid crystal lens structure comprising a first electrode set, a second electrode set and liquid crystal layer disposed between the first electrode set and the second electrode set. The second electrode set includes a first electrode structure and a second electrode structure. The first electrode structure includes a first transparent insulating layer and a first electrode layer disposed on the first transparent insulating layer, and the second electrode structure includes a second transparent insulating layer and a second electrode layer disposed on the second transparent insulating layer. The first electrode layer includes a plurality of first conductive lines, the second electrode layer includes a plurality of second conductive lines, and the first conductive lines and the second conductive lines are separated from each other and arranged alternately for providing a matrix electric field to the liquid crystal layer.

Another embodiment of the instant disclosure provides a liquid crystal lens structure comprising a first electrode set, a second electrode set and a liquid crystal layer. The second electrode set includes a plurality of first conductive lines and a plurality of second conductive lines separated from the first conductive lines. The liquid crystal layer is disposed between the first electrode set and the second electrode set. Each of the first conductive lines has a plurality of first corresponding points, each of the second conductive lines has a plurality of second corresponding points, and the first corresponding points of the first conductive lines and the second corresponding points of the second conductive lines cooperate with each other for providing a matrix electric field having a plurality of inducting points to the liquid crystal layer. Each of the inducting points is formed by one of the first corresponding points and one of the second corresponding points corresponding to each other.

Another embodiment of the instant disclosure provides a variable focal length liquid crystal lens assembly comprising two liquid crystal lens structures. Each of the liquid crystal lens structures includes a first electrode set, a second electrode set and a liquid crystal lens disposed between the first electrode set and the second electrode set. In each of the liquid crystal lens structures, the second electrode set includes a first electrode structure and a second electrode structure. The first electrode structure includes a first transparent insulating layer and a first electrode layer disposed on the first transparent insulating layer, and the second electrode structure includes a second transparent insulating layer and a second electrode layer disposed on the second transparent insulating layer. The first electrode layer includes a plurality of first conductive lines, the second electrode layer includes a plurality of second conductive lines, and the first conductive lines and the second conductive lines are separated from each other and arranged alternately for providing a matrix electric field to the liquid crystal layer.

As mentioned above, the variable focal length liquid lens assembly and the liquid crystal lens structure thereof provided by the instant disclosure have the technical features of "the first electrode layer includes a plurality of first conductive lines, the second electrode layer includes a plurality of second conductive lines, and the first conductive lines and the second conductive lines are separated from each other and arranged alternately for providing a matrix electric field to the liquid crystal layer" and "each of the first conductive lines has a plurality of first corresponding points, each of the second conductive lines has a plurality of second corresponding points, the first corresponding points of the first conductive lines and the second corresponding points of the second conductive lines cooperate with each other for providing a matrix electric field having a plurality of inducting points to the liquid crystal layer, and each of the inducting points is formed by one of the first corresponding points and one of the second corresponding points corresponding to each other.". Therefore, the advantages of the instant disclosure resides in that the variable focal length liquid lens assembly and the liquid crystal lens structure thereof can achieve the effect of spherical or aspherical lens by adjusting the refractive index at different locations in the liquid crystal lens structure. To be specific, the refractive index at different locations can be adjusted by adjusting the degree and direction of orientation of the liquid crystal molecules, and the orientation of the liquid crystal molecule can be controlled by adjusting the electric field strength of each inducting points in the matrix electric field.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
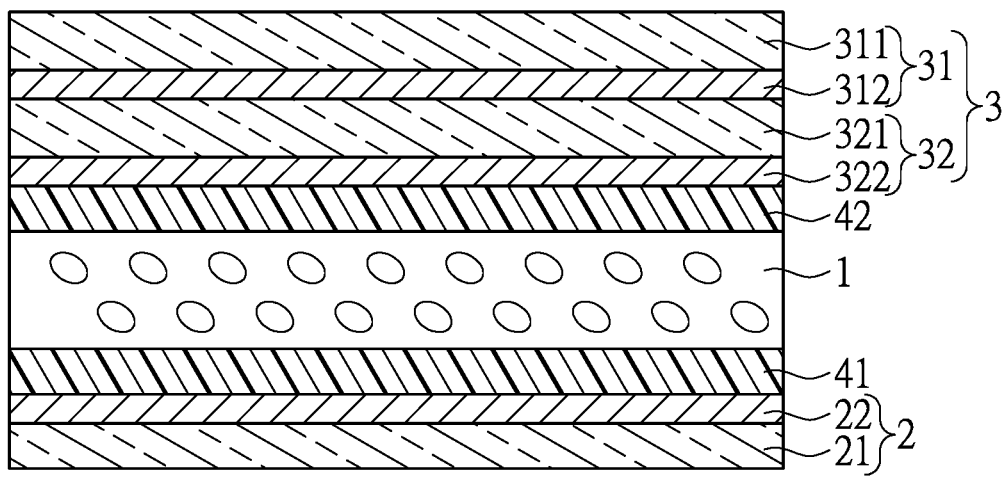
FIG. 1 is a sectional schematic view of a liquid crystal lens structure provided by an embodiment of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

Referring to FIG. 1, the liquid crystal lens structure L includes a first electrode set 2, a second electrode set 3 and a liquid crystal layer 1. The liquid crystal layer 1 is disposed between the first electrode set 2 and the second electrode set 3. In the embodiment shown in FIG. 1, the first electrode set 2 is disposed under the liquid crystal layer 1, and the second electrode set 3 is disposed above the liquid crystal layer 1.

In addition, the liquid crystal lens structure L provided by the instant disclosure can further include a first alignment layer 41 and a second alignment layer 42. The first alignment layer 41 is disposed between the first electrode set 2 and the liquid crystal layer 1, and the second alignment layer 42 is disposed between the second electrode set 3 and the liquid crystal layer 1. The main function of the first alignment layer 41 and the second alignment layer 42 is to align the arranging direction of the liquid crystal molecules in the liquid crystal layer 1 for achieving intended rotation (orientation) after receiving an electric field.

The first electrode set 2 includes a transparent insulating layer 21 and an electrode layer 22. The electrode layer 22 is disposed on the transparent insulating layer 21. Specifically, the first electrode set 2 includes the transparent insulating layer 21 as a substrate and the electrode layer 22 constituted by conductive lines. The second electrode set 3 includes a first electrode structure 31 and a second electrode structure 32. The first electrode structure 31 includes a first transparent insulating layer 311 and a first electrode layer 312 disposed on the first transparent insulating layer 311. The second electrode structure 32 includes a second transparent insulating layer 321 and a second electrode layer 322 disposed on the second transparent insulating layer 321.

In other words, in the embodiment shown in FIG. 1, the first electrode set 2 only includes one single structure including a substrate (the transparent insulating layer 21) and conductive lines (the electrode layer 22) disposed thereon, and the second electrode set 3 includes two structures each including a substrate and conductive lines disposed on the substrate. Each of the first electrode structure 31 and the second electrode structure 32 of the second electrode set 3 is a structure including a substrate and conductive lines.

In the embodiment shown in FIG. 1, the first electrode layer 312 is disposed between the first transparent insulating layer 311 and the second transparent insulating layer 321, and the second electrode layer 322 is disposed between the second transparent insulating layer 321 and the liquid crystal layer 1. In other words, the second electrode layer 322, the second transparent insulating layer 321, the first electrode layer 312 and the first transparent insulating layer 311 are sequentially arranged along a direction away from the liquid crystal layer 1. However, the order of the layered structures in the second electrode set 3 is not limited in the instant disclosure. For example, the order of the arrangement of the layered structures can be the second transparent insulating layer 321—the second electrode layer 322—the first transparent insulating layer 311—the first electrode layer 312 along a direction away from the liquid crystal layer 1.

It should be noted that since the liquid crystal lens structure L provided by the embodiments of the instant disclosure can produce an effect similar to that of an optical lens after light passes through by changing the degree of deflection (orientation) of the liquid crystal molecules, each of the layered structure of the liquid crystal lens structure L is preferably made of light-transmitting material for allowing light to pass through the liquid crystal lens structure L.

In the embodiments of the instant disclosure, the transparent insulating layer 21 of the first electrode set 2 and the first transparent insulating layer 311 and the second transparent insulating layer 321 of the second electrode set 3 are light-transmittable. For example, the transparent insulating layer 21, the first transparent insulating layer 311 and the second transparent insulating layer 321 are made of glass materials.

In addition, the electrode layer 22 of the first electrode set 2 and the first electrode layer 312 and the second electrode layer 322 of the second electrode set 3 can be made of light-transmitting conductive materials such as indium tin oxide (ITO), indium zinc oxide (IZO), indium gallium zinc oxide (IGZO) or any combination thereof. However, the instant disclosure is not limited thereto.

The thickness of each layered structure in the liquid crystal lens structure L would affect the effects (such as the permeability) of light passing through the liquid crystal lens structure L and the electric field strength needed for driving the liquid crystal molecules to deflect. Moreover, since existing electronic devices have become compact and miniaturized, and the liquid crystal lens structure or the liquid crystal lens including the same are widely used in these electronic devices, the liquid crystal lens structure and related products preferably have small dimensions to fulfill the requirements of light-weight and portability of the electronic devices. Therefore, in the embodiments of the instant disclosure, the thicknesses of the layered structures of the liquid crystal lens structure L, particularly the transparent insulating layer 21, the first transparent insulating layer 311 and the second transparent insulating layer 321 in the electrode set are controlled to be in appropriate ranges.

For example, in the embodiments of the instant disclosure, each of the transparent insulating layer 21, the first transparent insulating layer 311 and the second transparent insulating layer 321 has a thickness from 0.01 mm to 0.2 mm; preferably a thickness from 0.01 to 0.1 mm and most preferably a thickness from 0.01 to 0.05 mm.

Specifically, when each of the transparent insulating layer 21, the first transparent insulating layer 311 and the second transparent insulating layer 321 has a thickness in the above ranges, the overall dimension of the liquid crystal lens structure L can be significantly reduced. Compared to the glass layer serving as the substrate of conductive lines in the existing liquid crystal lens structures which generally have a thickness greater than 0.5 mm, the transparent insulating layer 21, each of the first transparent insulating layer 311, and the second transparent insulating layer 321 is a glass layer of 0.05 mm, thereby reducing the overall thickness of the liquid crystal lens structure L by 1.35 mm.

Figure 3:
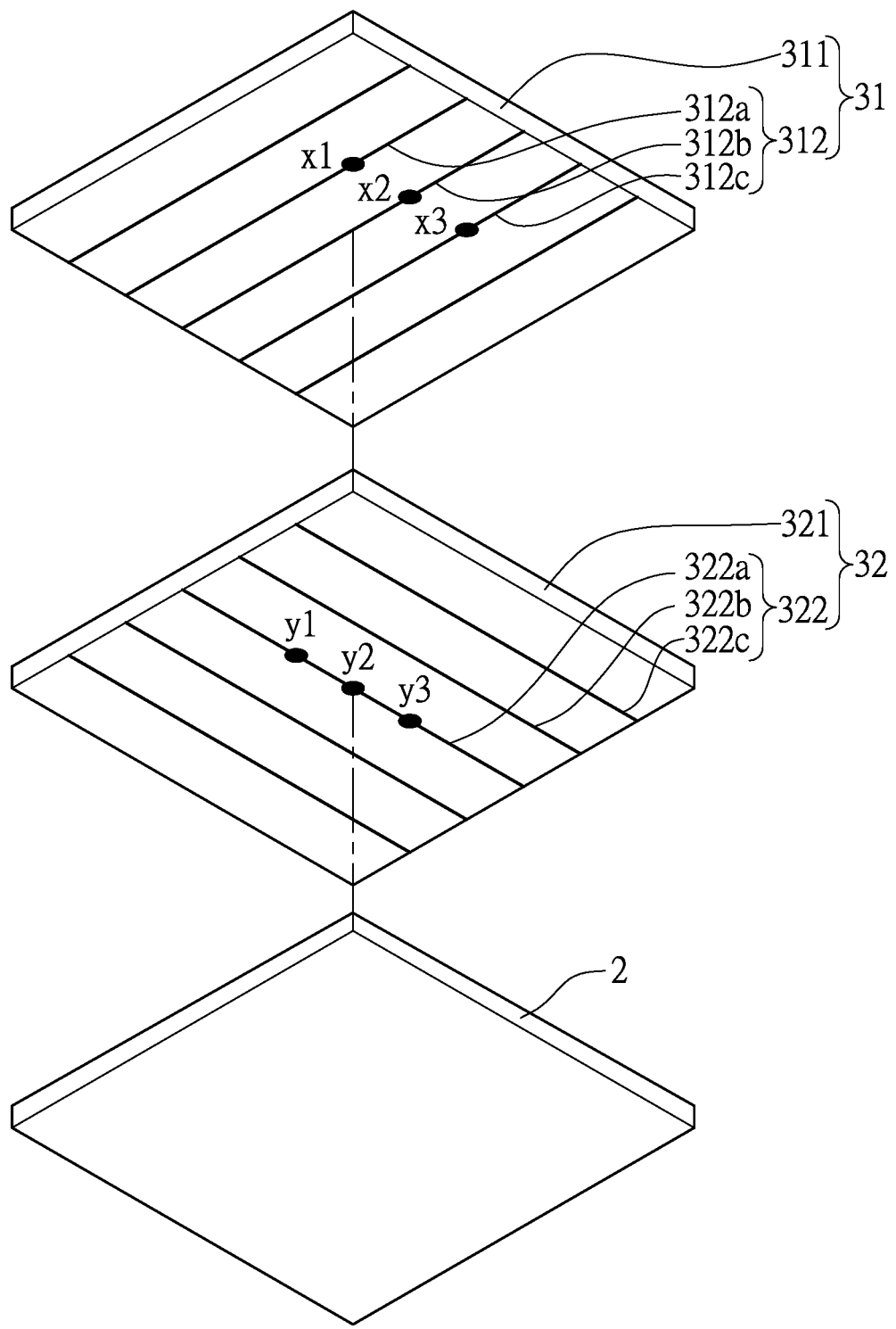
FIG. 3 is an exploded schematic view of a first electrode set and a second electrode set of a liquid crystal lens provided by an embodiment of the instant disclosure.

Referring to FIG. 3, the first electrode layer 312 includes a plurality of first conductive lines (312*a*, 312*b*, 312*c*) and the second electrode layer 322 includes a plurality of second conductive lines (322*a*, 322*b*, 322*c*). The first conductive lines (312*a*, 312*b*, 312*c*) and the second conductive lines (322*a*, 322*b*, 322*c*) are separated from each other and arranged alternately. In the embodiment shown in FIG. 3, the plurality of first conductive lines (312*a*, 312*b*, 312*c*) are arranged along a direction perpendicular to a direction on which the second conductive lines (322*a*, 322*b*, 322*c*) are arranged.

Based on the design of the first electrode structure 31 and the second electrode structure 32 in the second electrode set 3, the first electrode set 2 and the second electrode set 3 of the liquid crystal lens structure L provided by the embodiments of the instant disclosure can cooperate with each other to generate a matrix electric field. To be specific, as shown in FIG. 1, the liquid crystal lens structure L provided by the embodiments of the instant disclosure can further include a driver 5 (shown in FIG. 7). The driver 5 is electrically connected to the first electrode set 2 and the second electrode set 3. The driver 5 can provide same or different electric voltages to the first electrode structure 31 and the second electrode structure 32 for generating a voltage difference between the first electrode set 2 and the second electrode set 3, thereby providing an electric field to the liquid crystal layer 1 located between the first electrode set 2 and the second electrode set 3.

Specifically, the driver 5 can provide same or different electric voltages to each of the first conductive lines (312*a*, 312*b*, 312*c*) of the first electrode layer 312 of the first electrode structure 31 and each of the second conductive lines (322*a*, 322*b*, 322*c*) of the second electrode layer 322 of the second electrode structure 32. In other words, the first conductive line 312*a*, the first conductive line 312*b* and the first conductive line 312*c* can be provided with same or different electric voltages, and the second conductive line 322*a*, the second conductive line 322*b* and the second conductive line 322*c* can be provided with same or different electric voltages. Therefore, the first conductive lines (312*a*, 312*b*, 312*c*) and the second conductive lines (322*a*, 322*b*, 322*c*) arranged on the first transparent insulating layer 311 and the second transparent insulating layer 321 respectively have a voltage difference relative to the first electrode set 2, thereby providing an electric field to the liquid crystal layer 1. Specifically, the electric field provided to the liquid crystal layer 1 by the first conductive lines (312*a*, 312*b*, 312*c*) and the second conductive lines (322*a*, 322*b*, 322*c*) is a matrix electric field.

In the embodiments of the instant disclosure, the term "matrix electric field" represents that the electric field has a plurality of inducting points defined in a matrix, and by controlling the electric voltages applied to the first conductive lines (312*a*, 312*b*, 312*c*) and the second conductive lines (322*a*, 322*b*, 322*c*), the plurality of inducting points can have same or different electric field strength.

Referring to FIG. 3, the first conductive lines (312*a*, 312*b*, 312*c*) have a plurality of first corresponding points (x1, x2, x3), and the second conductive lines (322*a*, 322*b*, 322*c*) has a plurality of second corresponding points (y1, y2, y3). The plurality of first corresponding points (x1, x2, x3) of the first conductive lines (312*a*, 312*b*, 312*c*) and the plurality of second corresponding points (y1, y2, y3) of the second conductive lines (322*a*, 322*b*, 322*c*) cooperate with each other to provide a matrix electric field having a plurality of inducting points. Each of the inducting points includes one of the first corresponding points (x1, x2, x3) and one of the second corresponding points (y1, y2, y3), and the one of the first corresponding points (for example x1) and the one of the second corresponding points (for example y1) correspond to each other.

In FIG. 3, the first corresponding point x1, the first corresponding point x2 and the first corresponding point x3 are arranged on different conductive lines of the first electrode layer 312. The second corresponding point y1, the second corresponding point y2, the second corresponding point y3 are all arranged on the second conductive line 322*a* (i.e., the same conductive line). It should be noted that the corresponding points shown in the figures are only presented for the convenience of description and not for limiting the scope of the instant disclosure. In the instant disclosure, any first corresponding point can be arranged on any position on any first conductive line, and any second corresponding point can be arranged on any position on any second conductive line as long as the first corresponding points and the second corresponding point can correspond to each other and form the inducting points in the matrix electric field.

In other words, in the embodiment shown in FIG. 3, the electric field of the inducting points of the matrix electric field is generated by the electric voltages applied to the conductive lines in two layers of the electrode layer. The operational details of generating inducting points having different electric field strength by applying electric voltage on the conductive lines in the electrode layers will be described later.

As mentioned above, since the inducting points in the matrix electric field have same or different electric field strength, different locations in the liquid crystal layer 1 corresponding to the inducting points in the matrix electric field are subjected to different electric field strengths, thereby allowing the liquid crystal molecules to rotate (deflect) in different directions or degrees. In other words, when the driver 5 provides driving voltages to the first electrode set 2 and the second electrode set 3, the liquid crystal molecules in the liquid crystal layer 1 can have different rotation (orientation) modes in accordance with different electric fields in the matrix electric field.

Figure 4:
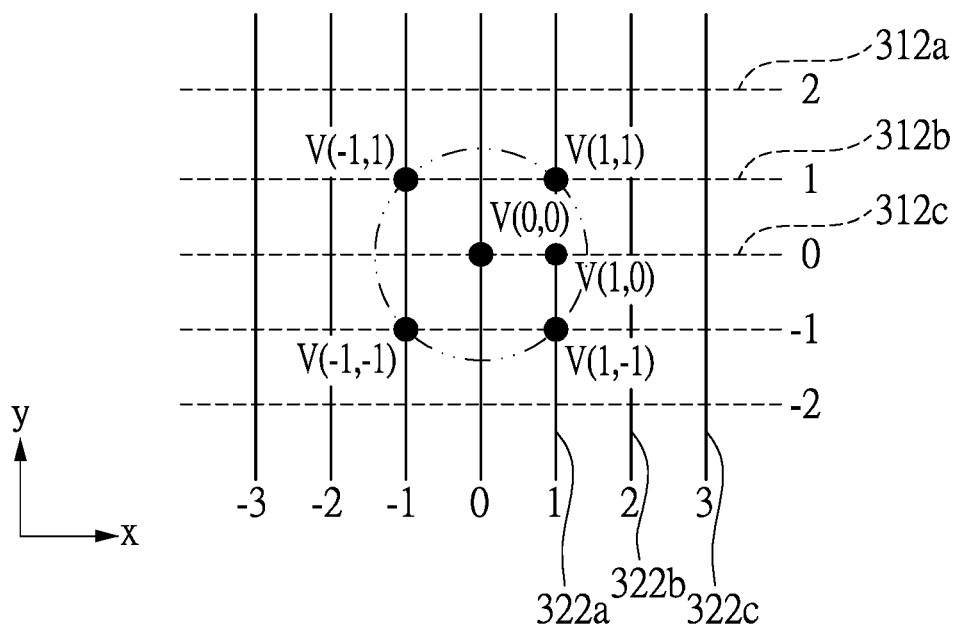
FIG. 4 is shows the cooperation of the first conductive lines and the second conductive of a liquid crystal lens provided by an embodiment of the instant disclosure.

Referring to FIG. 4, the inducting points generated by the cooperation of the second electrode set 3 and the first electrode set 2 is shown. In the first electrode structure 31 of the second electrode set 3, the first conductive lines (312a, 312b, 312c) of the first electrode layer 312 are arranged along the y axis. In the second electrode structure 32 of the second electrode set 3, the second conductive lines (322a, 322b, 322c) of the second electrode layer 322 are arranged along the x axis. Therefore, a matrix electric field having a plurality of inducting points can be generated. The locations of the inducting points are represented by coordinates (x, y).

For example, the center point on the surface of the liquid crystal layer 1 has an inducting point with the location coordinate of (0, 0) and is represented by V(0, 0). The inducting point located at the top right (in the positive x, positive y quadrant) of the center point has a location coordinate of (1, 1) and is represented by V(1, 1). Other inducting points in the matrix electric field are represented in the same manner. In addition, in the instant disclosure, the number of the inducting points in the matrix electric field are determined according to the number of the first conductive lines (312a, 312b, 312c) and the second conductive lines (322a, 322b, 322c), and can be adjusted according to actual needs. In other embodiments, a third electrode set can be further included between the liquid crystal layer 1 and the second electrode set 3 to increase the number of the inducting points.

Figure 2:
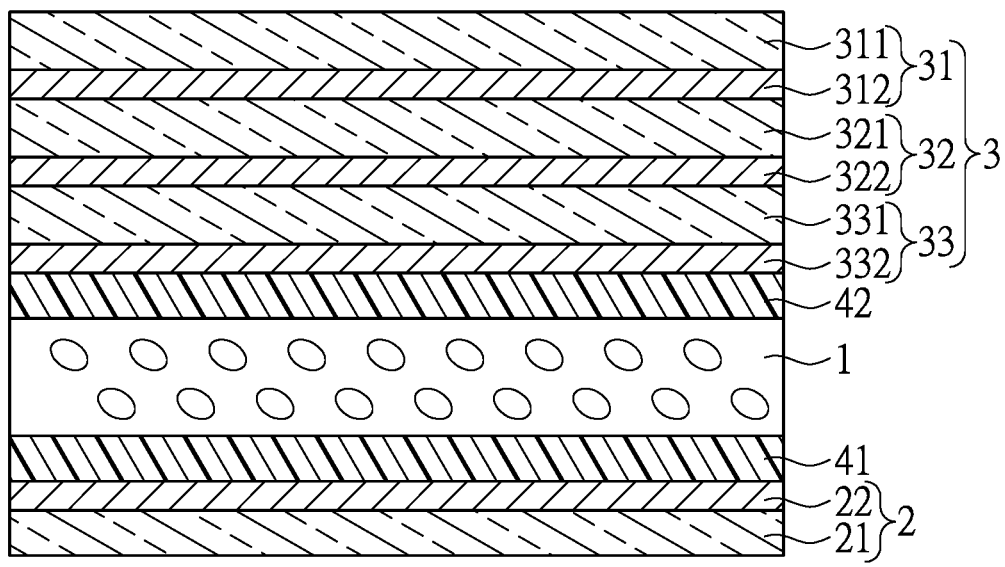
FIG. 2 is a sectional schematic view of a liquid crystal lens structure provided by another embodiment of the instant disclosure.

Referring to FIG. 2, in addition to the first electrode structure 31 and the second electrode structure 32, the second electrode set 3 of the liquid crystal lens structure L provided by the embodiments of the instant disclosure can further include a third electrode layer 332 and a third transparent insulating layer 331. In other words, as shown in FIG. 2, in an embodiment, the second electrode set 3 of the liquid crystal lens structure L further includes a third electrode structure 33. The third electrode layer 332 is disposed between the liquid crystal layer 1 and the third transparent insulating layer 331. The third electrode layer 332 is disposed between the third transparent insulating layer 331 and the second transparent insulating layer 321. The first electrode layer 312 is disposed between the second transparent insulating layer 321 and the first transparent insulating layer 311.

The third conductive lines in the third electrode layer 332 of the third electrode structure 33 can be arranged along a direction perpendicular or parallel to a direction on which the first conductive lines (312a, 312b, 312c) or the second conductive lines (322a, 322b, 322c) are arranged, or can be arranged on a direction extending along a different direction. In other words, as long as the third electrode structure 33 can increase the number of the inducting points in the matrix electric field generated by the first electrode set 2 and the second electrode set 3, or can adjust the electric field strength of the inducting points in the matrix electric filed, the structure thereof can be adjusted according to actual needs.

Figure 5:
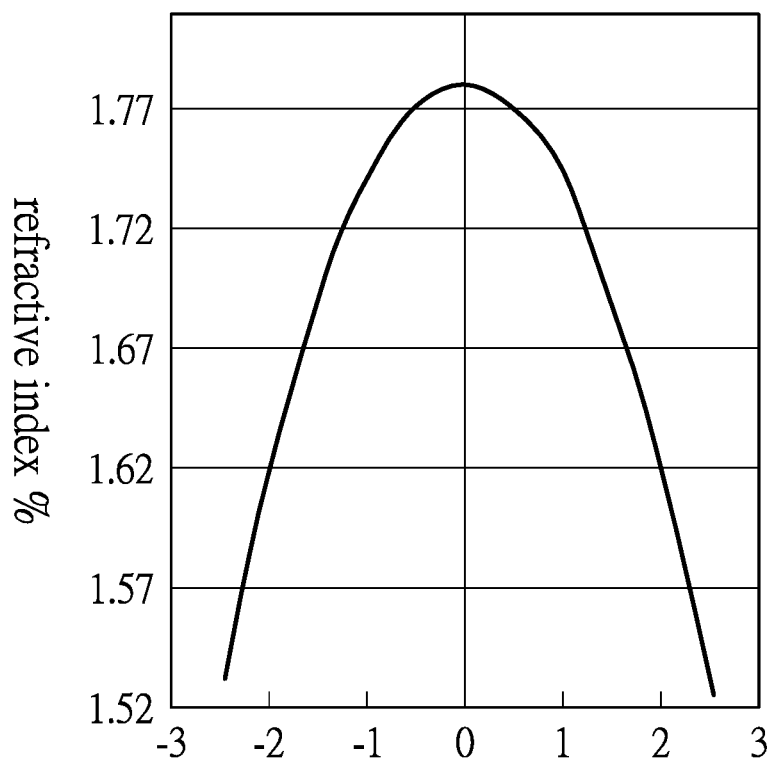
FIG. 5 is a diagram of the refractive index of a liquid crystal lens provided by an embodiment of the instant disclosure under a matrix electric field generated by a first electrode set and a second electrode set.

The details of forming the matrix electric field by the cooperation of the double-layer electrode layer (the first electrode layer 312 and the second electrode layer 322) are described herein. Referring to FIG. 4 and FIG. 5, by controlling the electric voltage applied on the first electrode layer 312 and the second electrode layer 322, the liquid crystal lens structure L provided by the instant disclosure can exhibit the properties of a spherical lens.

Specifically, as shown in FIG. 4, in the matrix electric filed generated by the second electrode set 3 and the first electrode set 2, the inducting points located on the dashed line (a circle) has the same electric field strength. For example, the four inducting points V(1,1), V(1,-1), V(-1,-1) and V(-1,1) have the same electric field strength a. In addition, the inducting point V(0,0) at the center of the matrix field has an electric field strength of 0.

FIG. 4 only illustrates some of the inducting points located between the inducting point V(0,0) and the dashed line. However, the number of the inducting points can be adjusted by adjusting the number of the first conductive lines (312a, 312b, 312c) and the second conductive lines (322a, 322b, 322c). As mentioned above, in another embodiment, a third electrode layer 332 can be included in the liquid crystal lens structure L to increase the number of the inducting points.

To ensure that the liquid crystal lens structure L has the function of a spherical lens, the electric field strength of the inducting points between the inducting point V(0,0) and the circle (illustrated by the dashed line) should be between 0 and 1 and is increased while the distance between the V(0,0) decreases. For example, the inducting point V(1,0) has an electric field strength of between 0 to a. Therefore, the electric field strengths of the inducting points in the matrix electric field vary in accordance to the coordinates of the inducting points. The electric fields of the inducting points in the matrix electric field have a gradient distribution.

Based on the design of the inducting points and the electric field strengths thereof, the rotation degrees of the liquid crystal molecules in the liquid crystal layer 1 corresponding to the matrix electric field formed by the first electrode set 2 and the second electrode set 3 vary. Since the refractive index in each of the locations of the liquid crystal layer 1 depends on the rotation degree of the liquid crystal molecules, the refractive index curve in the liquid crystal layer 1 is represented in FIG. 5 under the matrix electric field formed by the second electrode set 3 and the first electrode set 2 shown in FIG. 4. FIG. 5 is a diagram of the refractive index of the liquid crystal layer 1 taken along the first conductive line in the center of the first electrode set 2. The horizontal axis is the x value of the second electrode layer 322 of the second electrode structure 32, and the vertical axis is the refractive index.

The liquid crystal molecules in the liquid crystal layer 1 are driven by the matrix electric field and have different rotation degrees. The liquid crystal molecules near the center of the liquid crystal layer 1 are subjected to relatively low voltage and have smaller rotation degrees, and the liquid crystal molecules near to the edge of the liquid crystal layer 1 are subjected to relatively high voltage and have larger rotation degrees. Therefore, as shown in FIG. 5, the distribution of the refractive index in the liquid crystal layer 1 is depicted as a curve in which the refractive index at the center of the liquid crystal layer 1 is larger and the refractive index at the edge of the liquid crystal layer 1 is smaller. Accordingly, the liquid crystal layer 1 can stimulate the function of a spherical lens by adjusting the strength of the electric field of the inducting points in the matrix electric filed. In other words, the combination of the first electrode set 2 and the second electrode set 3 of the instant disclosure can achieve the function provided by a conventional circular electrode which allows the liquid crystal molecules in the liquid crystal layer 1 to rotate in a specific manner.

Specifically, the voltages applied onto two conductive lines crossing with each other in a projection plane should be controlled for allowing the inducting points in the matrix electric filed to have desired electric field strengths. The two conductive lines are located in the first electrode layer 312 and the second electrode layer 322 respectively. In other words, the voltages applied to the plurality of first corresponding points (x1, x2, x3) of the first conductive lines (312a, 312b, 312c) and the plurality of corresponding points (y1, y2, y3) of the second conductive lines (322a, 322b 322c) are controlled.

Referring to FIG. 4, the inducting point V(1,1) and the inducting point V(1, −1) have the same electric field strength. In order to allow the inducting point V(1, 0) located between the inducting point V(1,1) and the inducting point V(1, −1) to have an electric field strength smaller than that of the inducting point V(1,1) and the inducting point V(1, −1), the voltage applied to the first corresponding point x2 and the second corresponding point y2 of the V(1,−1) is adjusted.

In order to achieve the differences of the electric field between different inducting points, the second conductive line 322a in the second electrode layer 322 can receive a voltage of 1V. Meanwhile, a voltage 1V is also applied to the first conductive line 312a and the first conductive line 312c in the first electrode layer 312, and no electric voltage is applied to the first conductive line 312b in the first electrode layer 312. Therefore, the second corresponding point y1, the second corresponding point y2 and the second corresponding point y3 on the second conductive line 322a are subjected to a voltage of 1V. The first corresponding point x1 on the first conductive line 312a and the first corresponding point x3 on the first conductive line 312c are subjected to a voltage of 1V. In addition, the first corresponding point x2 on the first conductive line 312b is not subjected to electric voltage.

The electric field strength of the inducting point V(1,1) formed by the first corresponding point x1 and the second corresponding point y1 is equal to that of the inducting point V(1,−1) formed by the first corresponding point x3 and the second corresponding point y3, and the electric field strength of the inducting point V(1,0) is smaller than that of the inducting point V(1,1) and that of the inducting point V(1,−1).

In other words, by applying different driving voltages to the different conductive lines of the two electrode layers, the electric field strength of each of the inducting points in the matrix electric field can be accurately controlled. Therefore, the rotation degrees of the liquid crystal molecules in the liquid crystal layer 1 corresponding to the inducting points can be controlled. Accordingly, the refractive index at different locations of the liquid crystal layer 1 can be adjusted according to actual needs to achieve the variable focusing property of the liquid crystal lens structure L.

Figure 6:
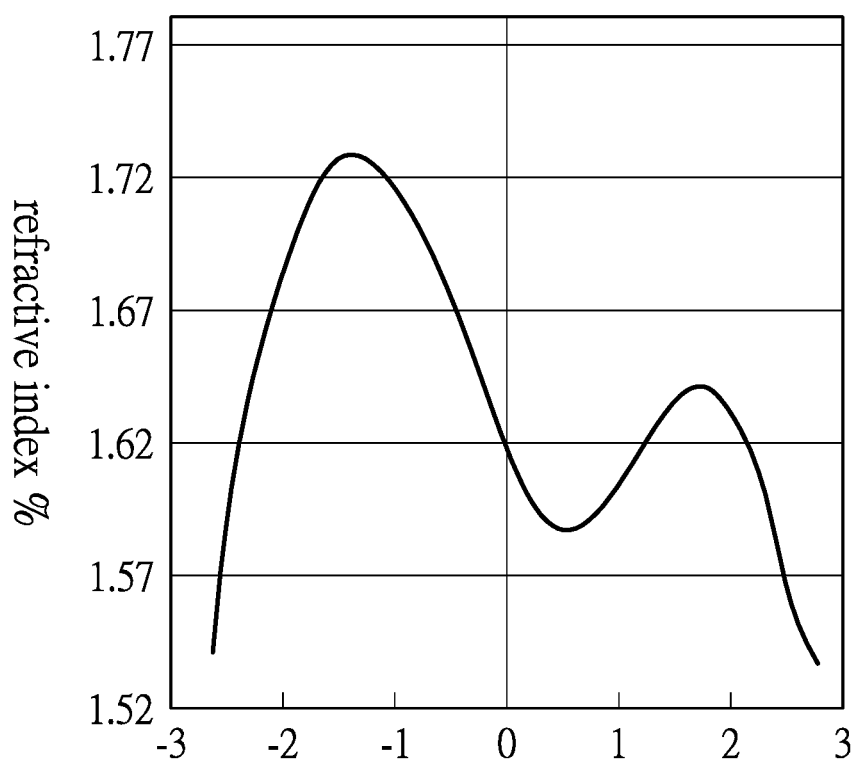
FIG. 6 is a diagram of the refractive index of a liquid crystal lens of provided by another embodiment of the instant disclosure under a matrix electric field generated by a first electrode set and a second electrode set.

Reference is next made to FIG. 6. FIG. 6 illustrates the curve of the refractive index of the liquid crystal layer 1 taken along the first conductive line at the center of the first electrode set 2. Different from the FIG. 5, by adjusting the electrical voltages applied to the first conductive lines (312a, 312b, 312c) and the second conductive lines (322a, 322b, 322c), the liquid crystal lens structure L can stimulate the effect of an aspherical lens. In order to obtain the refractive index curve as shown in FIG. 6, the voltages applied to the first corresponding points (x1, x2, x3) on the first conductive lines and the second corresponding point (y1, y2, y3) on the second conductive lines are controlled, and hence, the electric field strengths of the inducting points formed by the first corresponding points (x1, x2, x3) and the second corresponding points (y1, y2, y3) are controlled. Therefore, the refractive index at different locations in the liquid crystal layer 1 can be controlled.

Figure 7:
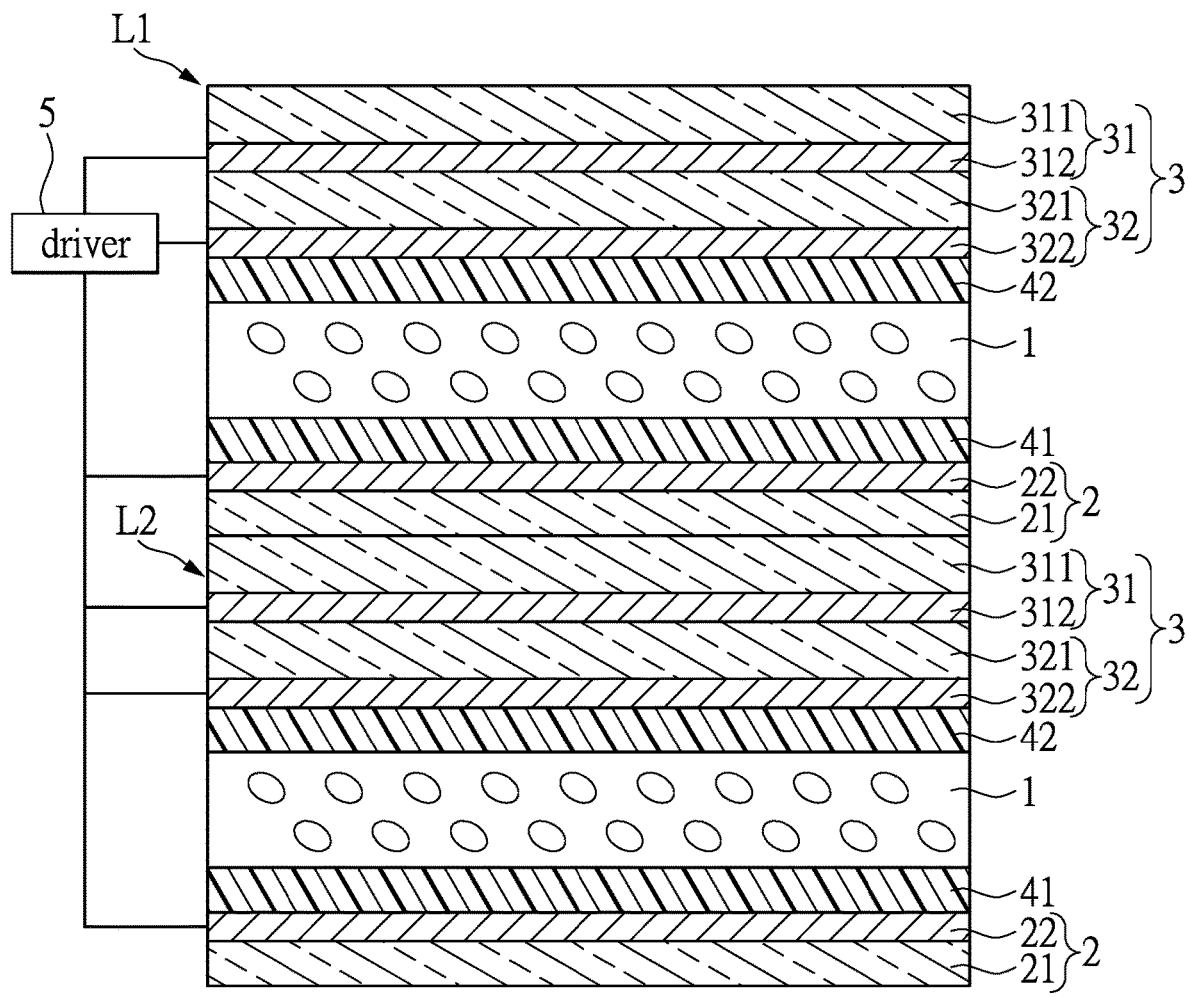
FIG. 7 is a sectional schematic view of a variable focal length liquid crystal lens assembly provided by an embodiment of the instant disclosure.

In addition, as shown in FIG. 7, the instant disclosure further provides a variable focal length liquid crystal lens assembly including two liquid crystal lens structures (L1, L2). Specifically, the variable focal length liquid crystal lens assembly provided by the instant disclosure includes at least two liquid crystal lens structures described in the above embodiments. Therefore, the effect of zoom-in/zoom-out can be achieved. When the variable focal length liquid crystal lens assembly includes three liquid crystal lens structures L, the size of the original image can be enlarged to 2 times that of the original size. The instant disclosure does not limit the number of the liquid crystal lens structure L in the variable focal length liquid crystal lens assembly.

Specifically, each of the liquid crystal lens structures (L1, L2) included in the variable focal length liquid crystal lens assembly includes a first electrode set 2, a second electrode set 3 and a liquid crystal layer 1 disposed between the first electrode set 2 and the second electrode set 3. As mentioned above, the second electrode set 3 includes a first electrode structure 31 and a second electrode structure 32, the first electrode structure 31 includes a first transparent insulating layer 311 and a first electrode layer 312 disposed on the first transparent insulating layer 311, and the second electrode structure 32 includes a second transparent insulating layer 321 and a second electrode layer 322 disposed on the second transparent insulating layer 321. The first electrode layer 312 includes a plurality of first conductive lines (312a, 312b, 312c), the second electrode layer 322 includes a plurality of second conductive lines (322a, 322b, 322c), and the first conductive lines (312a, 312b, 312c) and the second conductive lines (322a, 322b, 322c) are separated from each other and arranged alternatively for providing a matrix electric field to the liquid crystal layer 1. Other details regarding the liquid crystal lens structures (L1, L2) in the variable focal length liquid crystal lens assembly are similar to that described in the above embodiments, and are not reiterated herein.

In summary, the advantages of the instant disclosure is that the variable focal length liquid crystal lens assembly and the liquid crystal lens structure L thereof can achieve the effect of spherical or aspherical lens by adjusting the refractive index at different locations in the liquid crystal lens structure L. The refractive index at different locations in the liquid crystal lens structure L can be controlled by adjusting the rotation direction and degree of the liquid crystal molecular in the liquid crystal layer 1 which can be adjusted based on the electric field strengths of each of the inducting points V in the matrix electric field. The advantages mentioned above are achieved by the technical features of "the first electrode layer 312 includes a plurality of first conductive lines (312a, 312b, 312c), the second electrode layer 322 includes a plurality of second conductive lines (322a, 322b, 322c), and the first conductive lines (312a, 312b, 312c) and the second conductive lines (322a, 322b, 322c) are separated from each other and arranged alternatively for providing a matrix electric field to the liquid crystal layer 1" or "each of the first conductive lines (312a, 312b, 312c) has a plurality of first corresponding points (x1, x2, x3), each of the second conductive lines (322a, 322b, 322c) has a plurality of second corresponding points (y1, y2, y3), the first corresponding points (x1, x2, x3) of the first conductive lines (312a, 312b, 312c) and the second corresponding points (y1, y2, y3) of the second conductive lines (322a, 322b, 322c) cooperate with each other for providing a matrix electric field having a plurality of inducting points V to the liquid crystal layer 1, and each of the inducting points V is formed by one of the first corresponding points (x1, x2, x3) and one of the second corresponding points (y1, y2, y3) corresponding to each other".

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A liquid crystal lens structure, comprising:
   a first electrode set;
   a second electrode set;
   a liquid crystal layer disposed between the first electrode set and the second electrode set; and
   a driver electrically connected to the first electrode set and the second electrode set;
   wherein the second electrode set includes a first electrode structure and a second electrode structure, the first electrode structure including a first transparent insulating layer and a first electrode layer disposed on the first transparent insulating layer, the second electrode structure including a second transparent insulating layer and a second electrode layer disposed on the second transparent insulating layer;
   wherein the first electrode layer includes a plurality of first conductive lines, the second electrode layer includes a plurality of second conductive lines, and the first conductive lines and the second conductive lines are separated from each other and arranged alternately for providing a matrix electric field having a plurality of inducting points to the liquid crystal layer;
   wherein the driver provides same or different electric field strength to the plurality of inducting points in the matrix electric field;
   wherein each of the plurality of first conductive lines crosses all of the plurality of second conductive lines, and each of the plurality of second conductive lines crosses all of the plurality of first conductive lines in a projection plane.

2. The liquid crystal lens structure according to claim 1, wherein the second electrode set further includes a third electrode layer and a third transparent insulating layer, the third electrode layer being disposed between the liquid layer and the third transparent insulating layer, the second electrode layer being disposed between the third transparent insulating layer and the second transparent insulating layer, and the first electrode layer being disposed between the second transparent insulating layer and the first transparent insulating layer.

3. The liquid crystal lens structure according to claim 2, wherein the first transparent insulating layer, the second transparent insulating layer and the third transparent insulating layer are made of glass materials.

4. The liquid crystal lens structure according to claim 2, wherein each of the first transparent insulating layer, the second transparent insulating layer and the third transparent insulating layer has a thickness within the range of 0.01 mm to 0.2 mm.

5. The liquid crystal lens structure according to claim 2, wherein each of the first transparent insulating layer, the second transparent insulating layer and the third transparent insulating layer has a thickness within the range of 0.01 mm to 0.05 mm.

6. The liquid crystal lens structure according to claim 1, further comprising: a first alignment layer and a second alignment layer, the first alignment layer being disposed between the first electrode set and the liquid crystal layer, and the second alignment layer being disposed between the second electrode set and the liquid crystal layer.

7. The liquid crystal lens structure according to claim 2, wherein the first electrode layer, the second electrode layer and the third electrode layer are made of indium tin oxide.

8. A variable focal length liquid crystal lens assembly, comprising two liquid crystal lens structures, each of the liquid crystal lens structures including:
   a first electrode set;
   a second electrode set;
   a liquid crystal lens disposed between the first electrode set and the second electrode set; and
   a driver electrically connected to the first electrode set and the second electrode set;
   wherein in each of the liquid crystal lens structures, the second electrode set includes a first electrode structure and a second electrode structure, the first electrode structure including a first transparent insulating layer and a first electrode layer disposed on the first transparent insulating layer, the second electrode structure including a second transparent insulating layer and a second electrode layer disposed on the second transparent insulating layer;
   wherein in each of the liquid crystal lens structure, the first electrode layer includes a plurality of first conductive lines and the second electrode layer includes a plurality of second conductive lines, the first conductive lines and the second conductive lines being separated from each other and arranged alternately for providing a matrix electric field having a plurality of inducting points to the liquid crystal layer;
   wherein the driver provides same or different electric field strength to the plurality of inducting points in the matrix electric field;
   wherein each of the plurality of first conductive lines crosses all of the plurality of second conductive lines, and each of the plurality of second conductive lines crosses all of the plurality of first conductive lines in a projection plane.

* * * * *